Jan. 31, 1967   C. E. PLYMALE   3,301,928
METHOD OF AND APPARATUS FOR MAKING A BLOWN PLASTIC ARTICLE
Filed June 17, 1963   2 Sheets-Sheet 1

INVENTOR.
CHARLES E. PLYMALE
BY Spencer L. Blaylock, Jr.
W. A. Schaich
ATTORNEYS

3,301,928
METHOD OF AND APPARATUS FOR MAKING A BLOWN PLASTIC ARTICLE
Charles E. Plymale, Maumee, Ohio, assignor to Owens-Illinois, Inc., a corporation of Ohio
Filed June 17, 1963, Ser. No. 288,332
7 Claims. (Cl. 264—97)

The present invention relates to a method of and apparatus for making a blown plastic article. More particularly, the present invention is concerned with an apparatus for and a method of forming a blowable shape or parison from which a plastic article is formed.

In the manufacture of blown articles, such as containers, various methods of parison formation have been proposed. In the copending application of Thomas R. Santelli, Serial No. 146,686, filed October 17, 1961, and assigned to the assignee of the present invention, there is disclosed a method of and apparatus for forming a parison by injection molding plasticized material in an open ended parison recess and about a parison sleeve or "pin" projecting axially into the recess and terminating in spaced relation to one end thereof. The parison forming process results in a generally cylindrical parison having a closed end, thus forming a bubble which can be inflated, after enclosure in a pair of blow molds, to form the final article.

In the manufacture of elongated articles requiring an equivalent elongated parison, some difficulty has been encountered in the lateral displacement of the centrally located parison pin which, in order to form the closed-bottom parison, must project into the parison mold space in cantilever fashion. The present invention provides an improvement over the process of the above-identified Santelli application by providing a parison pin stabilizing element for accurately retaining the parison pin in its axial location in the parison mold recess while still accommodating the formation of the parison bottom wall.

In order to support the cantilevered end of the parison pin, a multi-purpose stabilizer or support element is provided; this support element serving (during injection molding of the parison side wall portions) to stabilize the parison pin and to align the pin axially in the parison mold, and being movable to a second position out of contact with the parison pin (during the formation of the parison bottom) and finally serving as a valve to shut off the flow of plasticized material to the parison chamber.

In this manner, it is possible to (1) stabilize and align the cantilevered parison pin in the parison mold chamber during formation of the parison side walls; (2) form the parison bottom wall only after the parison side walls have been formed; and (3) shut off the flow of plasticized material to the parison chamber as the complete parison is being formed. All of these functions are, in essence, carried out by the utilization of a single structural element together with a double acting biasing means urging the element to its initial, parison pin-stabilizing position and moving the element to its other positions.

It is, therefore, an important object of the present invention to provide an improved method of making a blown plastic article and wherein a blowable parison is formed about a parison pin stabilized in accurate axial alignment during formation of the parison.

Another important object of this invention is the provision of a parison forming apparatus wherein a parison pin is accurately retained in position during parison formation by means of a single, multi-purpose element serving both to stabilize the parison pin and to control the flow of plasticized material to the parison forming chamber.

A further object of this invention is the provision of an improved method for the formation of a parison from which a blown plastic article is formed by stabilizing the free end of a parison or parison forming pin projecting into a parison chamber to accurately locate the pin in the chamber, subsequently exposing the end of the pin to accommodate the formation of the parison bottom, and finally interrupting the flow of plasticized material into the parison chamber.

It is yet another, and no less important, object of this invention to provide an apparatus for injection molding a parison and including a displaceable valve element serving to stabilize a parison pin during formation of the major portion of the parison and movable toward a different position to accommodate the formation of the parison bottom and simultaneously therewith, interrupting the flow of plasticized material to the parison chamber.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
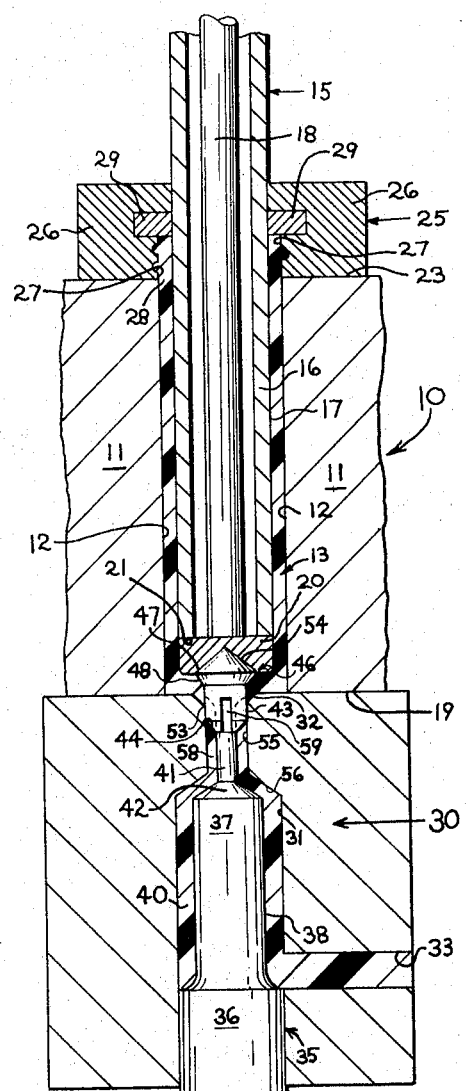
FIGURE 1 is a vertical sectional view, with parts shown in elevation, illustrating an apparatus of the present invention capable of carrying out the method of the present invention, the apparatus being illustrated with the parison pin being stabilized during formation of a major portion of the parison.

As shown on the drawings:

In FIGURE 1, reference numeral 10 refers generally to an apparatus of the present invention comprising a parison mold 11 of the type illustrated in the above-identified Santelli application and having a central, vertically extending, generally cylindrical recess 12 defining the outer wall of a parison mold chamber indicated generally at 13. Projecting into the parison mold recess 12 is a parison pin indicated generally at 15 and comprising an outer, generally cylindrical sleeve 16 having an exterior peripheral surface 17 spaced radially from the recess surface 12 to form the inner portion of the parison chamber 13.

Projecting axially through the sleeve 16 is an actuating rod 18 bearing at its lower end an enlarged valve head 20 contacting the free lower angular extremity 21 of the sleeve 16. The diameter of the valve head 20 is substantially the same as the external diameter of the sleeve 16, the valve head 20 and the sleeve 16 cooperatively defining the parison pin 15. It will be noted that the exposed lower surface 22 of the valve head terminates in spaced relation to the lower extremity 19 of the parison mold 11. The lower surface 22 is provided with a conical recess 54, the function of which will be explained hereinafter.

Abutting the exposed upper surface 23 of the parison mold 11 is a neck mold structure indicated generally at 25 and comprising a pair of laterally separable neck mold blocks 26 having cooperative, semi-annular recesses 27, respectively, surrounding the sleeve 16 and defining therewith an interior mold recess 28 having the contour of a finished, non-blown portion of the final article to be formed, such as the neck of a blown container. Each of the neck mold sections 26 carries an insert 29 defining the upper end of a complete parison mold space.

The parison mold 10 is superimposed upon a supply block indicated generally at 30 and having a cylindrical bore 31 therethrough axially aligned with the mold space 13. At the intersection of the mold space 13 and the bore 31, an outwardly and upwardly directed shoulder 32 is defined, this shoulder being annular in configuration. At the lower end 53 of the shoulder 32, a cylindrical bore 55 is defined. The bore 55 is of a smaller diameter than the cylindrical bore 31 and is axially aligned therewith. A downwardly and outwardly sloping annular surface 56 is provided which joins cylindrical bores 31 and 55.

The bore 31 is adapted to receive plasticized material from a suitable source, such as a plasticizer-extruder (not shown) through a lateral supply passage 33. Projecting axially through the bore 31 is an axially displaceable stabilizer or valve body, indicated generally at 35. This valve body 35 is generally cylindrical in configuration and includes a lower portion 36 having an external diameter snugly fitting within the recess 31. A reduced diameter cylindrical central portion 37 is provided with an exterior surface 38 spaced radially inwardly from the surface of the bore 31 to define an annular material flow passage 40 communicating with the supply passage 33.

The upper surface of the valve body 35 is defined by a further reduced diameter portion 41 joined to the reduced diameter portion 37 by a chamfered joining portion 42, and an enlarged valve portion 43 having an external diameter substantially the same as the diameter of the bore 55 and smaller than the diameter of the parison mold bore 11. This valve portion 43 is joined to the reduced diameter portion 41 by a chamfered joining portion 44 and is provided with a plurality of grooves 59. The valve body 35 is provided with a valve head indicated generally at 46. Valve head 46 comprises a conical end portion 47, the lower end portion of which is greater in diameter than the valve portion 43 and is joined thereto by a chamfered joining portion 48. The joining portion 48 is constructed and arranged to seat against shoulder 32 of supply block 30.

The conical end portion 47 of the terminal valve head portion 46 is constructed to be snugly received thereagainst by the exposed conical recess 54 of the valve head 20 when the apparatus is positioned as illustrated in FIGURE 1. The chamfered joining portion 42, reduced diameter portion 41 and joining portion 44 of the valve body 35 are spaced radially inwardly from the annular surface 56 and cylindrical bore 55 of the supply block 30 to define an annular material flow passage 58 communicating with the material flow passage 40.

It will be noted that the enlarged portion 36 of the valve body 35 extends below the supply block 30 and is secured at its lower end, as at 49, to a fluid motor piston 50 enclosed within an actuating cylinder 51 adapted to receive fluid under pressure through supply lines 52 and 57 leading, for example, to sources of compressed air. The piston-cylinder 50, 51 thus serves to bias the valve body 35 to its upper, stabilizing position of FIGURE 1 and to lower the valve body 35 to its lower positions of FIGURES 2 and 3.

Figure 2:
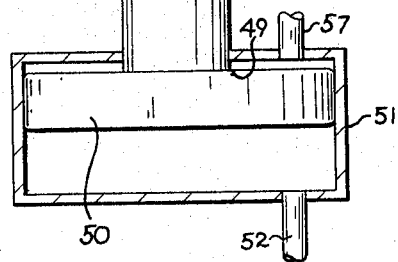
FIGURE 2 is a view similar to FIGURE 1 illustrating the apparatus during formation of the parison bottom.
Figure 2:
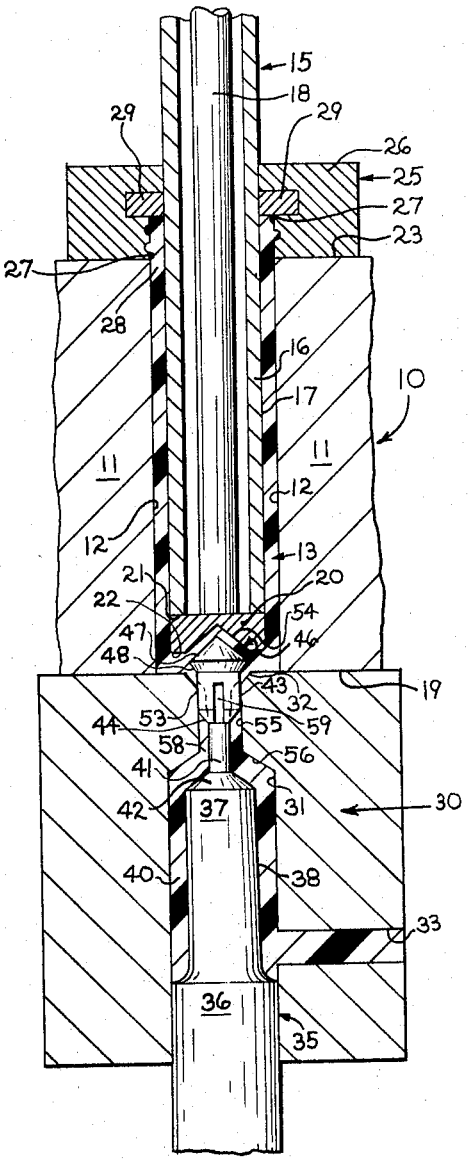
Figure 3:
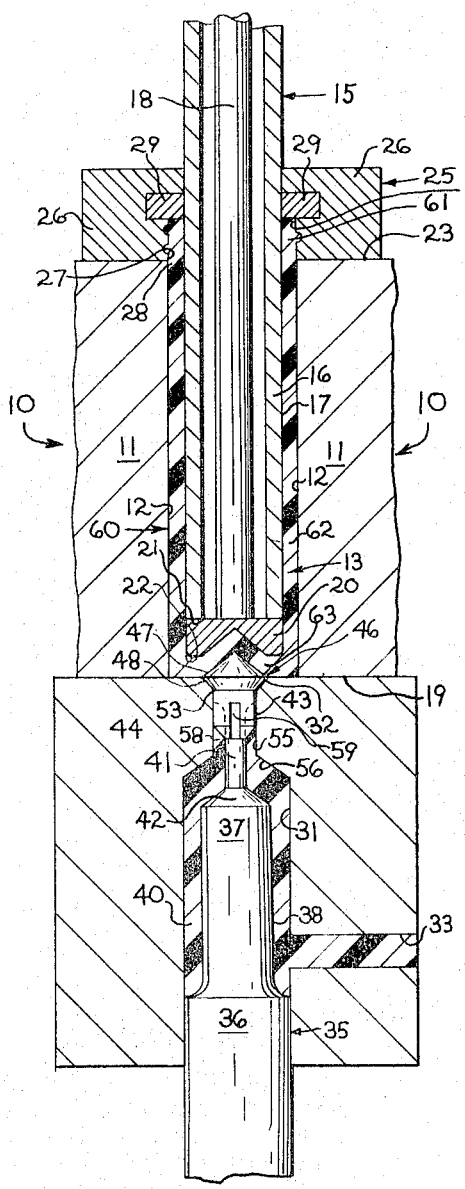
FIGURE 3 is a view similar to FIGURES 1 and 2 and illustrating the formation of the complete parison.
Figure 4:
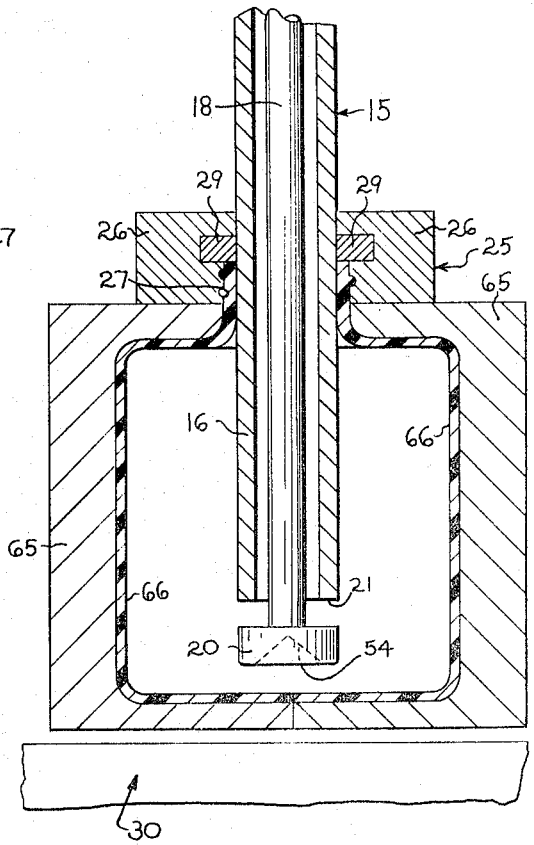
FIGURE 4 is a view illustrating the blowing of the parison to its final article configuration.

The operation of the apparatus and the performance of the method of the present invention will be readily appreciated by a comparison of FIGURES 1, 2 and 3.

As best shown in FIGURE 1, the apparatus is initially positioned with the parison pin assembly 15 inserted into the recess 12 to define the annular mold space 13 and with the neck ring sections 26 assembled as illustrated to define the upper neck mold cavity 28. Pressure within the conduit 52 and the cylinder 51 will urge the piston 50 upwardly, thereby displacing the valve element 35 into abutment with the undersurface of the valve head 20, i.e., the conical end portion 46 of the valve body will project into the conical recess 54 of the valve head 20.

Next, plasticized material under pressure from the source (not shown) enters the mold space 13 through the supply passage 33 and the flow passages 40, 58 and slots 59, the material passing between the exterior periphery of the valve body head 46 and the bore wall 12 of the parison mold 11 to completely fill the mold space 13 with plasticized material. Due to contact between the valve body 35 and the parison pin 15, the pin 15 is stabilized in the parison mold recess against any radial displacement during flow of the material into the mold space.

After filling of the mold space 13, the pressure within conduit 52 is relieved and pressure is supplied to conduit 57 thereby moving the piston 50 in the direction of the conduit 52 to displace the valve body downwardly. Suitable valving arrangements and controls are provided (not shown) to control the movement of piston 50. As the valve body 35 is first urged downwardly, the conical end portion 47 of the valve body becomes spaced from the conical recess 54 of the valve head 20 and the position of FIGURE 2 is attained. At this time, the conical end portion 47 of the valve head 46 of the valve body 35 is subjected to the pressure of the plasticized material to further urge the valve body toward its position of FIGURE 3.

At the same time, communication is now established between the conical end portion 47 and the plasticized material so that the same is introduced onto the undersurface of the valve head 20 to initiate the formation of the closed end of the parison. As the valve body 35 moves toward its position of FIGURE 3, the valve portion 43 is brought into contact with the cylindrical bore 55, thereby shutting off the flow of plasticized material through slots 59, to the parison mold space 13, thereby fulfilling the valving function of the valve body 35. Continued downward movement of valve body 35 results in the plasticized material trapped between the shoulder 32 and chamfered surface 48 being displaced into the space occupied by the valve head 46. This position is illustrated in FIGURE 3 of the drawings.

Thus, by the time that the position of FIGURE 3 is attained, a complete parison 60 is formed, the parison consisting of the finish or neck portion 61, the cylindrical side walls 62 and a complete parison bottom 63, the parison being completely isolated from the supply conduit 33 by the valve body 35 interposed therebetween.

Finally, the completed parison 60 is stripped from the parison mold 10 by relative axial displacement or, alternatively, by opening the parison mold 11 in the event that a split-type parison mold is utilized. The parison is preferably transferred as a unit with the parison pin 15 to be enclosed in a pair of separable blow mold sections 65 having their inner surfaces 66 contoured to the configuration of the finished article. Next, the valve head 20 is moved relative to the sleeve 16 and blow air under pressure is introduced through the sleeve and about the head actuating rod 18 to inflate the parison from the sleeve 16 and against the chill walls 66 of the blow mold 65. Finally, the blow molds are opened and the finished article is removed.

Thus, it will be appreciated that the present invention provides a method of and apparatus for forming a parison in an injection mold and about a parison pin utilizing a valve element movable relative to the parison pin to fulfill a plurality of functions. First, the valve element 35 is normally biased to its position of FIGURE 1 by suitable means, i.e. the cylinder 51 and piston 50 or by an upwardly thrusting compression spring, if desired. In its position of FIGURE 1, the valve element accommodates the formation of the side walls of the parison, constituting the major portion of the parison, while supporting the parison pin against deflection or displacement due to the forces exerted thereon by the plasticized material introduced into the mold space 13.

Secondly, the pressure of the plasticized material introduced into the mold space 13 aids in displacing the valve element 35 against the biasing means to accommodate the formation of the parison bottom. By utilizing the pressure of the plasticized material, any cavitation at the parison bottom is avoided and smooth and continuous formation of the parison bottom is insured. The introduction of the plasticized material into the region defining the parison bottom intermediate the end of the parison pin and the valve element is accommodated by the valve head portion 46. Finally, the valve body serves to shut off the flow of plasticized material to the mold space 13.

It will be understood that various modifications may be resorted to without departing from the spirit and scope of the following claims.

I claim:

1. In a method of making a blow molded article from a closed bottom injection molded parison formed about a central parison pin projecting axially into a parison mold recess to define an annular mold space therebetween, the steps of contacting the free end of the pin with a combination aligning and valving means holding the pin against radial deflection and in axial alignment with the axis of said mold recess, flowing plasticized material through a valve passage and about said aligning and valving means to fill said annular mold space with said material, relatively moving said pin and said aligning and valving means out of contact and flowing plasticized material into the space between said pin and said aligning and valving means to form the closed bottom of said parison, and closing said valve passage with said aligning and valving means by positioning said aligning and valving means in contact with a surface of said valve passage so that said aligning and valving means blocks said passage to thereby shut off the flow of plasticized material into said mold space.

2. In a method of making a blow molded article from a closed bottom parison formed about a central parison pin projecting axially into a parison mold recess to define an annular mold space therebetween, the steps of abutting the free end of the parison pin with a stabilizer element which holds the pin against radial deflection and in axial alignment with the axis of said mold recess, partially filling the annular mold space with plasticized material by flowing said material through a valve passage and about said stabilizer element into said annular mold space while continuing to hold said pin with said stabilzer element, moving the stabilizer element from abutment with the pin and filling the space between said stabilizer element and said pin to complete the parison, and closing said valve passage with said stabilizer element by moving said stabilizer element into contact with a surface of said valve passage so that said stabilizer element blocks said passage to thereby shut off the flow of plasticized material into said mold space.

3. In a method of making a blow molded article from an injection molded parison having one open end and one closed end, the parison being formed about a central parison pin projecting axially into a parison mold recess to define an annular mold space therebetween, the steps of abutting the free end of the parison pin with a valve body which holds the pin in accurate axial alignment with the axis of said recess, said valve body having a first position in contact with said pin and being movable to a second position spaced from said pin in which said valve body contacts and blocks a valve passage through which plasticized material is supplied to said annular mold space, while said valve body is in said first position flowng plasticized material through said valve passage into said mold space to fill said mold space, shifting said valve body away from abutment with said pin and filling the space between said valve body and said pin with plasticized material to form a closed end of said parison, and moving said valve body to said second position thereof to block said valve passage with said valve body and thereby shut off the flow of plasticized material to said mold space.

4. The method of claim 3 in which the movement of said valve body from said first position to said second position is a continuous motion during which the space between the valve body and the pin is filled with plasticized material.

5. In an apparatus for making an inflatable parison of plasticized material and including a parison mold communicating with a source of plasticized material under pressure and a parison pin projecting axially into the mold space to terminate short of the open end thereof, the improvements of a movable aligning and valving means projecting into said mold space through the open end thereof, means forming a flow path about said aligning and valving means including a valve passage through which plasticized material from said source flows into said mold space, said movable valving and aligning means having a first position in which it contacts said parison pin and having a second position spaced from said pin in which it contacts a surface of said valve passage and blocks flow of plasticized material to said mold space, means urging said aligning and valving means to said first position thereof to centralize said pin in said mold space and open said valve passage for flow of plasticized material through said valve passage into said mold space, and means for moving said aligning and valving means to said second position thereof for flow of plasticized material into the space between said aligning and valving means and said parison pin during said movement to form the closed end of a parison and for closing said valve passage with said aligning and valving means in said second position thereof to prevent any further flow of plasticized material into said mold space.

6. In an apparatus for making an inflatable parison of plasticized material and including the parison mold having a mold space with an open end communicating with a source of plasticized material under pressure and the parison pin projecting axially into the mold space to terminate short of the open end thereof, the improvements of a valve body interposed between the mold space and said source, a valve passage through which plasticized material flows from said source to said mold space, said body having a conical shaped end projecting into the mold space for contacting a registering conical recess in the parison pin and a valve portion for fitting with said valve passage to block said passage and thereby shut off the flow of plasticized material into said parison mold, means biasing said valve body into contact with the parison pin centralizing said pin in said mold space and opening said valve portion, and means for shifting said valve body to a position blocking said valve passage for interrupting the flow of material from said source to said mold space, said valve portion being constructed and arranged to form the closed end of said parison when shifted to its closed position.

7. An apparatus for making a parison having a closed end and adapted to be blown to a final shape, comprising a parison mold enclosing a mold space open at each end, a parison pin projecting freely through one end of said mold space to terminate in a free end adjacent to and spaced from the other end thereof, said free end having a conical recess therein, a valve passage at said other end of said mold space through which plasticized material flows into said mold space, a movable valve element projecting through said valve passage and having a first position in contact with said free end of said parison pin and a second position in contact with said valve passage and blocking said valve passage to prevent any flow of plasticized material into said mold space, said valve element having a conical end portion adapted to fit with said conical recess in said parison pin, means for biasing said valve element to said first position thereof wherein said valve element holds said parison pin in a centered position in said mold space and opens said valve passage for flow of plasticized material into said mold space and for moving said valve element to said second position thereof wherein said valve element blocks said valve passage to prevent any further flow of plasticized material to said mold space, said valve element being constructed and arranged to form the closed end of a parison in the space between said pin and said valve element when said valve element is shifted to said second position thereof.

References Cited by the Examiner

UNITED STATES PATENTS

| | | | |
|---|---|---|---|
| 2,262,612 | 11/1941 | Kopitke | 264—97 |
| 2,825,093 | 3/1958 | High | 264—328 |
| 3,023,458 | 3/1962 | Seymour | 264—328 |

FOREIGN PATENTS

| | | |
|---|---|---|
| 962,726 | 12/1949 | France. |
| 1,150,189 | 8/1957 | France. |
| 1,329,922 | 5/1963 | France. |
| 909,555 | 10/1962 | Great Britain. |

ROBERT F. WHITE, *Primary Examiner.*

R. B. MOFFITT, *Assistant Examiner.*